(12) United States Patent
Huhn et al.

(10) Patent No.: US 12,736,087 B2
(45) Date of Patent: Sep. 15, 2026

(54) UNIVERSAL JOINT CROSS

(71) Applicant: AKTIEBOLAGET SKF, Gothenburg (SE)

(72) Inventors: Norbert Huhn, Schweinfurt (DE); Gianni Alvise Cognolato, Trofarello (IT); Stefanie Seufert, Rothhausen (DE); Pietro Fabio Picatto, Turin (IT); Baptiste Vidil, Levallois-Perret (FR); Daniele Duch, San Gillio (IT); Juergen Barthelme, Würzburg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 28 days.

(21) Appl. No.: 19/083,564

(22) Filed: Mar. 19, 2025

(65) Prior Publication Data

US 2025/0305541 A1 Oct. 2, 2025

(30) Foreign Application Priority Data

Mar. 26, 2024 (IT) ........................ 102024000006781

(51) Int. Cl.
*F16C 33/78* (2006.01)

(52) U.S. Cl.
CPC ................................ *F16C 33/7823* (2013.01)

(58) Field of Classification Search
CPC ..... F16D 3/16; F16D 3/20; F16D 3/26; F16D 3/38; F16D 3/382; F16D 3/385; F16C 33/7823; F16C 33/7863; F16C 33/7883

(Continued)

(56) References Cited

U.S. PATENT DOCUMENTS 3,479,840 A * 11/1969 Meyers ..................... F16D 3/41 277/412
4,337,628 A * 7/1982 Greene ..................... F16D 3/41 277/374

(Continued)

FOREIGN PATENT DOCUMENTS

DE 2322879 A1 * 11/1974
DE 4128179 A1 * 2/1993 ............. F16D 3/385

(Continued)

OTHER PUBLICATIONS

Written Opinion and Search Report from the Italian Patent Office mailed Sep. 24, 2024 in related application No. IT 102024000006781, and translation thereof.

*Primary Examiner* — Jonathan P Masinick
(74) *Attorney, Agent, or Firm* — J-TEK LAW PLLC; Scott T. Wakeman; Mark A. Ussai

(57) ABSTRACT

A universal joint cross includes a trunnion, a cup, rolling elements between the cup and the trunnion, and a seal. The seal seals a seals a space between the cup and the trunnion and includes an elastomeric member, wherein a first rigid part of the seal has, in an axial section, a first arm and at least one second arm, which are connected by an intermediate section of the first rigid part. The first arm and the second arm extend from the intermediate section toward the rolling elements and the second arm abuts against the trunnion. The intermediate section includes a first region, which contacts at least one projection of a face surface of the elastomeric member or which provides a gap seal or a labyrinth seal with the at least one projection, and at least a second region, which contacts the face surface of the elastomeric member.

11 Claims, 1 Drawing Sheet

(58) Field of Classification Search
USPC .................................................. 464/131, 133
See application file for complete search history.

(56) References Cited

U.S. PATENT DOCUMENTS 4,512,672 A * 4/1985 Olschewski ........ F16C 33/7809 384/477
5,769,723 A * 6/1998 Faulbecker ......... F16C 33/7809 277/300
6,050,571 A * 4/2000 Rieder .................... F16D 3/385 464/131
8,142,292 B2 * 3/2012 Ledford ............... F16J 15/3232 464/131
10,570,965 B2 * 2/2020 Khan .................. F16C 33/7823
11,009,075 B2 * 5/2021 Mitsuishi ............. F16J 15/3264
11,168,739 B2 * 11/2021 Berruet ............... F16C 33/7879
11,193,542 B2 * 12/2021 Hauck ................... F16C 21/005
11,401,968 B2 * 8/2022 Cope ....................... F16D 3/385
11,953,058 B2 * 4/2024 Duch .................... F16C 33/805
11,965,547 B2 * 4/2024 Mattes .................. F16C 21/005
12,247,629 B2 * 3/2025 Hauck ................... F16C 33/805
2010/0160052 A1 6/2010 Ledford et al.
2018/0058508 A1 * 3/2018 Campbell ........... F16C 33/1065
2020/0370604 A1 11/2020 Berruet et al.
2020/0392996 A1 12/2020 Hauck et al.
2022/0403880 A1 12/2022 Mattes
2025/0243910 A1 * 7/2025 Huhn .................... F16D 3/2057
2025/0305541 A1 * 10/2025 Huhn .................. F16C 33/7823

FOREIGN PATENT DOCUMENTS

DE 4408831 A1 * 9/1995 ............. F16D 3/385
DE 102006044272 A1 * 4/2008 ......... B60B 27/0073
DE 102008017409 A1 * 10/2009 ........... F16J 15/3264
DE 102015211215 A1 * 12/2016 ........... F16J 15/3264
DE 102015218629 A1 * 3/2017 ............ F16C 19/543
DE 102017101821 A1 * 8/2017 .......... F16C 33/7883
DE 102018218280 A1 * 5/2019 ......... B60B 27/0005
DE 102020205653 A1 11/2020
DE 102019208775 A1 12/2020
DE 102021206412 A1 12/2022
JP S5359049 U 5/1978
JP H0478335 U 7/1992
JP 6686342 B2 4/2020

* cited by examiner

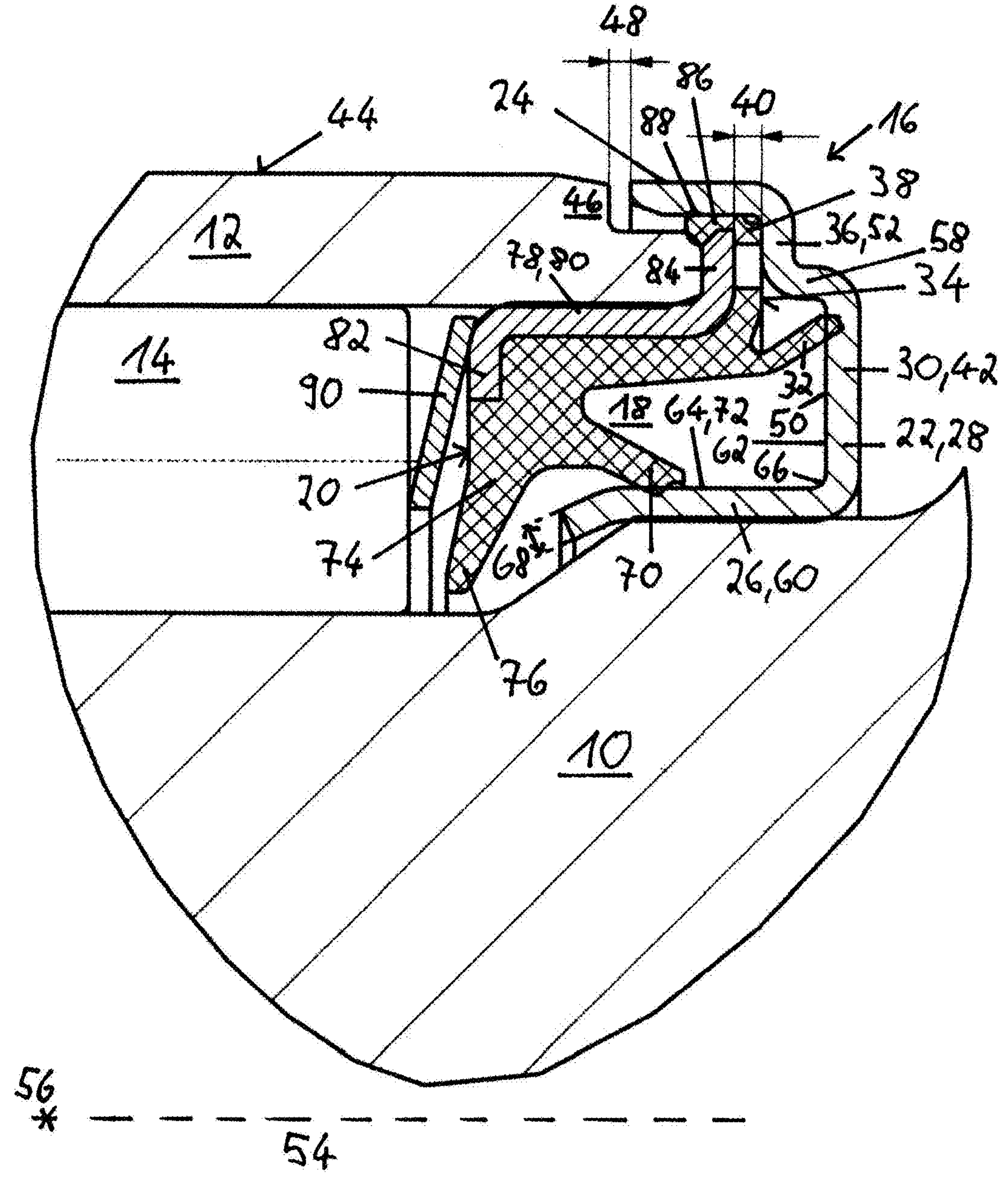
48
86
40
24
88
16
44
38
46
36,52
12
58
78,80
84
34
14
82
30,42
32
90
18
64,72
50
62
22,28
20
66
74
68
70
26,60
76
10
56
54

UNIVERSAL JOINT CROSS

CROSS-REFERENCE

This application claims priority to Italian patent application no. 1020204000006781 filed on Mar. 26, 2024, the contents of which are fully incorporated herein by reference.

BACKGROUND OF THE INVENTION

The present invention relates a universal joint cross, in particular to a universal joint crosses forming a part of a universal joint.

German patent publication no. DE 102019208775A1 discloses a cup and a seal of a universal joint. The seal seals a space between the cup and a trunnion of the universal joint. The trunnion is part of a universal joint cross of the universal joint. Rolling elements of the universal joint are supposed to roll on the cup and the trunnion. An insert part of the seal, which may be made from metal, has in an axial section a straight segment extending essentially radially and a first axial extension at a radially outer end and a second axial extension at a radially inner end. An elastomeric element, which is fixed at the insert part, is at least partially located radially inwardly with respect to the insert part.

Other seals for universal joints are disclosed in German patent publications nos. DE 102020205653A1 and DE 102021206412A1.

SUMMARY OF THE INVENTION

An object of the present invention is in particular to provide a universal joint cross with an efficient construction.

As such, the present invention is a universal joint cross with a trunnion, a cup, rolling elements between the cup and the trunnion, and a seal is proposed, which seals a space between the cup and the trunnion and which comprises an elastomeric member, wherein a first rigid part of the seal comprises in an axial section a first arm and at least a second arm, which are connected by an intermediate section of the first rigid part, wherein the first arm and the second arm extend from the intermediate section towards the rolling elements, wherein the second arm abuts against the trunnion, wherein the intermediate section comprises a first region, which is in contact with at least one projection of a face surface of the elastomeric member or which builds a gap seal or a labyrinth seal with at least one projection of the face surface of the elastomeric member, and at least a second region, which is in contact with the face surface of the elastomeric member. Through this an efficient construction can be achieved. In particular, a robust fixation of the first rigid part to the trunnion can be obtained, which at the same time provides a good sealing between the trunnion and the first rigid part. In particular, a good sealing effect between the elastomeric member and the first rigid part may be achieved together with a relatively low friction between the first rigid part and the elastomeric member.

In particular, the projection can be a scaling lip.

With advantage the second region abuts against a region of the elastomeric member, which has an axial thickness, which is between 10% and 150% of a thickness of a section of the first rigid part, which consists of metal sheet. An "axial thickness" as used herein is intended to mean a thickness measured in an axial direction of the trunnion. Through this structure, an axial position of the first rigid part relative to the cup is relatively exactly determined, if the first rigid part is pressed against the region of the elastomeric member during the assembly, such that in a finally assembled state the first rigid part touches or contacts the region of the elastomeric member, because the region of the elastomeric member can only be compressed by a small distance in the axial direction.

Advantageously, a radially outer surface of the cup includes at least one step and a distance between the first rigid part and the step is greater than the thickness of the region of the elastomeric member. Through this, a contact between the first rigid part and the step is prohibited, which means that noise and wear generated by contact between the step and the first rigid part is prevented. In particular, a distance between the first rigid part and the step is at least the sum of the thickness of the region of the elastomeric member and 0.2 millimeters.

Moreover, it is suggested that the intermediate section includes a first segment and at least one second segment, each of which extends essentially radially in an axial section. It should be understood herein that the segment extending "essentially" radially in an axial section means in particular that the longitudinal direction of the segment forms an angle of less than 20° with a radial direction of the trunnion in the axial section. Thereby, a simple and cost-effective construction can be achieved.

With advantage, the second segment has a greater distance from a principal axis of the trunnion than the first segment and the second segment has a lesser axial distance to a center of mass of the cup than the first segment. By a "principal axis" of the trunnion in particular a straight line should be understood, which is parallel to an axial direction of the trunnion and which contains a center of mass of the trunnion. By an "axial distance" between the second segment and a center of mass of the cup in particular a distance between the second segment and the center of mass of the cup measured in an axial direction of the trunnion should be understood. Through this structure, a high stiffness of the first rigid part, and in particular a high robustness of the first rigid part against stone chipping can be achieved. In particular, a low risk of significant deformation of the first rigid part by installation forces can be achieved.

Furthermore, the intermediate section includes in the axial section at least one essentially axial segment, which connects the first segment and the second segment. It should be understood herein that an "essentially" axial segment means a segment, which has a longitudinal direction and which forms an angle with an axial direction of the trunnion which is less than 20°. Thereby, a simple and cost-effective construction may be achieved.

Preferably, in the axial section, the length of the essentially axial segment is between 30% and 120% of the length of the second segment. Through this a compact construction in axial direction may be achieved, such that a relatively great amount of space is available in the axial direction for the rolling elements.

Moreover, it is preferred that at least a region of the first rigid part consists of metal sheet and in an axial section an axially inner side of the intermediate section and a radially outer side of the second arm are connected by a circular arc with a radius, which is larger than 1.8 times the thickness of the metal sheet. By an "axially inner" side of the intermediate section in particular a side of the intermediate section should be understood, which is directed towards the rolling elements. By a "radially outer" side of the second arm in particular a side of the second arm should be understood, which is directed away from the trunnion. Thereby, the axial force, which is necessary for fixing the first rigid part on the trunnion, may be high enough for a good fixation and is still low enough, such that the assembly of the first rigid part on the trunnion can be managed relatively easily.

Preferably, at least one sealing lip of the seal abuts against a radially outer surface of the second arm. A "radially outer" surface of the second arm should be understood to mean a surface of the second arm which is directed away from the trunnion. Through this, wear of the sealing lip depends only on parts of the seal. As a result, a manufacturer of the seal can have a good control over the wear of the seal.

Furthermore, it is suggested that the trunnion is free from any direct contact with a sealing lip. Thereby the wear of the sealing lip is not influenced by the trunnion. As a result, a manufacturer of the seal can achieve good control over the wear of the seal.

BRIEF DESCRIPTION OF THE SEVERAL VIEWS OF THE DRAWINGS

Further advantages can be seen in the following description of the drawings. An example of an embodiment of the invention is shown in the drawings. The drawings, the description and the claims contain numerous features in combination. The skilled person will expediently also consider the features individually and combine them to form useful further combinations.

FIG. 1 shows a section through a part of a universal joint cross according to the invention along an axial direction of a trunnion of the universal joint cross.

DETAILED DESCRIPTION OF THE INVENTION

FIG. 1 shows an axial section through a part of a universal joint cross along an axial direction of a trunnion 10 of the universal joint cross. The universal joint cross comprises a cup 12, a seal 16 and rolling elements 14, which are located between the cup 12 and the trunnion 10. Together the cup 12, the trunnion 10 and the rolling elements 14 form a bearing. The seal 16 seals a space 18 between the cup 12 and the trunnion 10 and includes an elastomeric member 20 and a first rigid part 22. In the axial section, the first rigid part 22 includes a first arm 24 and at least one second arm 26, which are connected by an intermediate section 28 of the first rigid part 22.

The seal 16, the cup 12 and the trunnion 10 may be rotationally symmetric with respect to a principal axis 54 of the trunnion 10. The principal axis 54 is parallel to an axial direction of the trunnion 10 and a center of mass of the trunnion 10 is located on the principal axis 54. The first arm 24 and the second arm 26 extend from the intermediate section 28 toward the rolling elements 14 and the second arm 26 abuts against the trunnion 10. A projection 32 of a face surface 34 of the elastomeric member 20 abuts against a first region 30 of the intermediate section 28. The projection 32 is a sealing lip, which extends essentially axially. Moreover, the intermediate section 28 includes a second region 36, which is in contact with the face surface 34 of the elastomeric member 20.

The first rigid part 22 consists of metal sheet or "sheet metal". The second region 36 of the intermediate section 28 abuts against a region 38 of the elastomeric member 20, the region 38 having an axial thickness 40 which is between 10% and 150% of a thickness of a section 42 of the first rigid part 22. For example, the axial thickness 40 can be between 60% and 90% of the thickness of the section 42. Due to the first rigid part 22 being pressed against the region 38 during assembly, a good precision of the final position of the first rigid part 22 relative to the cup 12 may be achieved due to the thickness 40 being relatively small or minimal. A radially outer surface 44 of the cup 12 includes a step 46. A distance 48 between the first rigid part 22 and the step 46 may be at least the sum of the thickness 40 of the region 38 of the elastomeric member 20 and 0.2 millimeters.

The intermediate section 28 includes a first segment 50 and at least one second segment 52, each of which extends radially in the axial section. The first segment 50 may have, for example, a length that is between three times and five times greater than a length of the second segment 52. The second segment 52 is located at a greater radial distance from the principal axis 54 of the trunnion 10 than is the first segment 50, and the second segment 52 is located at a lesser axial distance to a center of mass 56 of the cup 12 than is the first segment 50. The intermediate section 28 includes, in the axial section, at least one axial segment 58, which connects the first segment 50 and the second segment 52. In the axial section, a length of the axial segment 58 is between 30% and 120% of a length of the second segment 52. For example, the length of the axial segment 58 can be between 50% and 80% of the length of the second segment 52.

Preferably, the first rigid part 22 is fixed on the trunnion by a force-fit or a press fit. The first rigid part 22, and in particular a region 60 of the first rigid part 22, preferably consists of metal sheet or sheet metal. In the axial section, an axially inner side 62 of the intermediate section 28 and a radially outer side 64 of the second arm 26 are connected by a circular arc 66. The circular arc has a radius, which is greater than 1.8 times the thickness 68 of the metal sheet.

A sealing lip 70 of the elastomeric member 20 abuts against a radially outer surface 72 of the second arm 26. Moreover, the trunnion 10 is free from any direct contact with any sealing lip.

The projection 32 and the sealing lip 70 are part of a first elastomeric element 74 of the elastomeric member 20. The elastomeric element 74 also includes a further sealing lip 76, which extends essentially radially inwardly. The first elastomeric element 74 is fixed to a second rigid part 78 of the seal 16. The second rigid part 78 includes an intermediate segment 80, which is preferably fixed to the cup 12 by a force-fit. At a first axial end, the second rigid part 78 includes an extension 82, which protrudes radially inwardly, and at a second axial end, the second rigid part 78 includes further extension 84, which protrudes radially outwardly. The extension 84 abuts against a face side of the cup 12 and against the region 38 of the elastomeric member 20. The region 38 is part of a second elastomeric element 86 of the elastomeric member 20, which is fixed to the second rigid part 78. A region of the second elastomeric element 86 is located in a groove, which is formed or defined by the cup 12 and the second extension 84 of the second rigid part 78. Moreover, the second elastomeric element 86 includes, on a radially outer surface, a projection 88, which fixes the first rigid part 22 by a force-fit to the second elastomeric element 86 and thereby to the cup 12. Because the projection 88 is small, there is no risk that installation forces may heavily deform the projection 88. A cup spring 90 abuts against the first extension 82 and against the rolling elements 14 such that an axial force is exerted on the rolling elements 14.

Because the face side of the step 46 serves no function, it can be produced with a relatively low precision and therefore in a very cost-efficient way.

The seal 16 is a cassette type of seal, which is very robust.

During assembly, the seal 16 is at first fixed to the cup 12, such that the seal 16 is prepositioned and centered relative to the cup 12. This facilitates safe mounting of the first rigid part 22 on the trunnion 10.

Because of the size of the distance 48, there is no risk of metal-to-metal contact between the cup 21 and the first rigid part 22 generating noise or wear during operation. Since no elastomeric element is fixed to the first rigid part 22, costs are thereby saved or reduced.

The element 86 and the first rigid part 22 form a labyrinth seal, which protects the projection 32.

Furthermore, the universal joint cross also comprises three other trunnions and three other cups (none shown).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

| List of reference numerals: | |
|---|---|
| 10 | trunnion |
| 12 | cup |
| 14 | rolling element |
| 16 | seal |
| 18 | space |
| 20 | elastomeric member |
| 22 | rigid part |
| 24 | first arm |
| 26 | second arm |
| 28 | intermediate section |
| 30 | first region |
| 32 | projection |
| 34 | face surface |
| 36 | second region |
| 38 | region |
| 40 | thickness |
| 42 | section |
| 44 | surface |
| 46 | step |
| 48 | distance |
| 50 | segment |
| 52 | segment |
| 54 | axis |
| 56 | center of mass |
| 58 | segment |

-continued

| List of reference numerals: | |
|---|---|
| 60 | region |
| 62 | side |
| 64 | side |
| 66 | arc |
| 68 | thickness |
| 70 | sealing lip |
| 72 | surface |
| 74 | element |
| 76 | lip |
| 78 | rigid part |
| 80 | Intermediate segment |
| 82 | extension |
| 84 | extension |
| 86 | element |
| 88 | projection |
| 90 | cup spring |

We claim:

1. A universal joint cross comprising:

a trunnion;

a cup;

a plurality of rolling elements disposed between the cup and the trunnion; and a seal configured to seal a space between the cup and the trunnion and including an elastomeric member and a first rigid part, the elastomeric member having a face surface and at least one projection extending from the face surface, the first rigid part including a first arm, a second arm, and an intermediate section connecting the first arm and the second arm, the first arm and the second arm each extending from the intermediate section toward the rolling elements, the second arm abutting against the trunnion, the intermediate section including a first region, which is in contact with the least one projection of the elastomeric member or which defines a gap seal or a labyrinth seal with the at least one projection, and a second region which is in contact with the face surface of the elastomeric member.

2. The universal joint cross according to claim 1, wherein the second region of the intermediate section of the first rigid part abuts against a region of the elastomeric member, the region of the elastomeric member having an axial thickness of between 10% and 150% of a thickness of a section of the first rigid part.

3. The universal joint cross according to claim 2, wherein the first rigid part is formed of sheet metal.

4. The universal joint cross according to claim 2, wherein the cup has a radially outer surface including a step and an axial distance between the first rigid part and the step is greater than the axial thickness of the region of the elastomeric member.

5. The universal joint cross according to claim 1, wherein the intermediate section of the first rigid part includes a first segment and a second segment, the first and second segments extending essentially radially.

6. The universal joint cross according to claim 5, wherein the second segment is located a greater distance from a principal axis of the trunnion than is the first segment and the second segment is located a lesser axial distance to a center of mass of the cup than is the first segment.

7. The universal joint cross according to at least one of the claim 5, wherein the intermediate section includes at least one essentially axial segment connecting the first segment and the second segment.

8. The universal joint cross according to claim 7, wherein a length of the essentially axial segment is between 30% and 120% of a length of the second segment.

9. The universal joint cross according to claim 1, wherein at least a region of the first rigid part is formed of sheet metal and an axially inner side of the intermediate section and a radially outer side of the second arm are connected by a circular arc with a radius, the radius being at least 1.8 times greater than a thickness of the sheet metal.

10. The universal joint cross according to claim 1, wherein the seal includes a sealing lip abutting against a radially outer surface of the second arm of the intermediate section.

11. The universal joint cross according to claim 1, wherein the trunnion is free from any direct contact with a sealing lip.

* * * * *